United States Patent [19]

Gras et al.

[11] Patent Number: 4,864,545

[45] Date of Patent: Sep. 5, 1989

[54] PROCESS FOR THE DETECTION OF HETEROGENEITIES AND/OR FOR THE DETERMINATION OF PETROPHYSICAL CHARACTERISTICS OF GEOLOGICAL STRATA OF A MEDIUM TO BE EXPLORED

[75] Inventors: Claude Gras, Le Vesinet; Patricia Arditty, Marly Le Roi; Philippe Staron, Mennecy, all of France

[73] Assignee: Societe Nationale Elf Aquitaine (Production), Courbevoie, France

[21] Appl. No.: 938,451

[22] Filed: Dec. 5, 1986

[30] Foreign Application Priority Data

Oct. 28, 1986 [FR] France .................. 86 14962

[51] Int. Cl.⁴ ............................................. G01V 1/40
[52] U.S. Cl. ........................................ 367/31; 367/30; 367/47; 364/422
[58] Field of Search .................. 367/25, 29, 30, 31, 367/33, 47, 57, 26, 27; 364/422

[56] References Cited

U.S. PATENT DOCUMENTS

| | | | |
|---|---|---|---|
| 4,131,875 | 12/1978 | Ingram | 73/152 |
| 4,460,986 | 7/1984 | Millonet et al. | 367/27 |
| 4,562,557 | 12/1985 | Forks et al. | 367/27 |
| 4,575,830 | 3/1986 | Ingram et al. | 367/26 |
| 4,592,030 | 5/1986 | Arditty et al. | 367/27 |
| 4,628,725 | 12/1986 | Gouilloud et al. | 73/861.27 |
| 4,633,449 | 12/1986 | Ingram et al. | 367/25 |

OTHER PUBLICATIONS

Arditty et al, "State of the Art on EVA . . . Imaging", 10/21/82, pp. 322-325, S & G, Dallas, Texas.
Naville et al, "Study of Reflected Events . . . Systems", 9th Int. SAID, Trans. 16 pages, 1984, Paris, France, abst.
Arditty et al, "First Results . . . The Signal", 10/23, 1981, Trans. Commun., #9, 8 pages, 7th SPWLA, Paris, abst.
Arditty et al, "Evaluation of Formation Properties from Processing and Interpretation of the EVA Tool Logs", The Apea Journal, 1986.
"Attribution du prix Charles Bihoreau 1984", Petrole et Technique, No. 309, Aug./Sep. 1984.
Arditty et al, "Fracture and Permeability Study from Full Waveform Acoustic Data in Crystalline Formations", SEG 1985, Washington, BHG.6.7.
Arditty et al, "State of the Art on EVA* Data Processing: An Improvement in Subsurface Imaging", SEG 1982, Dallas, L1.7.
Arditty et al, "Improvement of Formation Properties Evaluation Through the Processing and Interpretation Results of the EVA Tool Recordings", SEG 1984, Atlanta, BHG2.5.
Mathieu et al, "Application of Full Waveform Acoustic Logging Data to the Estimation of Reservoir Permeability", SEG 1984, Atlanta, BHG1.5.
Arditty et al, "EVA: A Long Spacing Sonic Tool for Evaluation of Velocities and Attenuations", 51st Annual SEG Meeting in Los Angeles.

*Primary Examiner*—Nelson Moskowitz
*Attorney, Agent, or Firm*—Foley & Lardner, Schwartz, Jeffery, Schwaab, Mack, Blumenthal & Evans

[57] ABSTRACT

Process for the detection of heterogeneities of a medium. It is defined in that logs of the attenuation of the shear waves and STONELEY waves are produced, the variations of each attenuation log in relation to a mean value are determined, and then the variations are compared with one another in such a manner as to determine the nature of the heterogeneity or of the petrophysical characteristic which has produced these variations. Application in particular in the area of oil and more particularly in the exploration of a medium. FIG. 9.

7 Claims, 9 Drawing Sheets

FIG_1

SEQUENCE CLASSIQUE

| | |
|---|---|
| R1 | E1 |
| R1 | E2 |
| R1 | E3 |
| R1 | E4 |
| R2 | E1 |
| R2 | E2 |
| R2 | E3 |
| R2 | E4 |
| R3 | E1 |
| R3 | E2 |
| R3 | E3 |
| R3 | E4 |
| R4 | E1 |
| R4 | E2 |
| R4 | E3 |
| R4 | E4 |
| ... | ... |
| R12 | E3 |
| R12 | E4 |
| R1 | E1 |
| R1 | E2 |

- séquence de 48 traces - intervalle entre traces
=
16 mm 1 séquence
=
48 × 16 mm
=
768 mm

FIG_2

FIG.3

| trace n° | SEQUENCE COMPOSITE | séquence n° |
|---|---|---|
| 1 | R1     E1 | |
| 2 | trace intercalée  n° 1 | 1 |
| 3 | R1     E2 | |
| 4 | trace intercalée  n° 2 | |
| 5 | R1     E3 | |
| 6 | trace intercalée  n° 3 | |
| 7 | R1     E4 | |
| 8 | trace intercalée  n° 4 | |
| 9 | R2     E1 | |
| 10 | trace intercalée  n° 1 | - séquence de |
| 11 | R2     E2 | 96 traces - |
| 12 | trace intercalée  n° 2 | |
| 13 | R2     E3 | intervalle |
| 14 | trace intercalée  n° 3 | entre traces |
| 15 | R2     E4 | = |
| 16 | trace intercalée  n° 4 | 8 mm |
| 17 | R3     E | |
| 18 | | 1 séquence |
| 19 | R3     E | = |
| 20 | | 768 mm |
| 21 | R3     E | |
| 22 | | |
| 23 | R3     E | |
| 24 | trace intercalée  n° 4 | |
| ... | R4     E | |
| | R4     E | |
| | R4     E | |
| | R4     E | |
| | trace intercalée  n° 4 | |
| | ... | |
| | ... | |
| | ... | |
| | R12    E | |
| | R12    E | |
| | trace intercalée  n° 4 | |
| | R1     E | |
| | R1     E | 2 |

PROCESS FOR THE DETECTION OF HETEROGENEITIES AND/OR FOR THE DETERMINATION OF PETROPHYSICAL CHARACTERISTICS OF GEOLOGICAL STRATA OF A MEDIUM TO BE EXPLORED

The present invention relates to a process for the detection of heterogeneities and/or for the determination of petrophysical characteristics of geological strata or formations of a medium to be explored.

The knowledge of the structure of a compact formation in which a deposit or reservoir is situated is progressively improved in order to define better the conditions of production of the deposit and the reserves of the deposit, as well as the level of recovery of the hydrocarbons, which are likely to be trapped in the compact formation.

The determination of a certain number of characteristics is essential for the study and the analysis of the structure. Among these characteristics, it is possible to mention saturation, porosity, permeability and formation fracturing.

The saturation and the porosity of a formation are very accessible by usual techniques which are not always easy to carry out. Nevertheless, they seem to be well-controlled and, in any event, they give satisfactory results.

On the other hand, the permeability and the formation fracturing are more difficult to determine in situ, since they may be closely linked. This originates from the fact that the permeability due to the presence of fractures in the formation of the medium to be explored is, in general, very high and greater than the matrix permeability, the brief definition of which is the capacity of a non-fractured porous stratum to allow the passage of a fluid.

In the course of the exploitation of a deposit containing hydrocarbons, it is very important to determine whether a fractured rock or stratum is present, in such a manner as possibly to improve the flow of the fluids of the deposit through the said rock or stratum of the formation. In fact, the determination of fractures existing in any particular zone is a factor which plays a part in the decisions to be taken in the course of putting a well into production. Thus, priority is given to the perforation of the fractured zones containing hydrocarbons, or it is desired to know the stresses in situ which are developed in certain zones, in order to decide on possible fracturing by mechanical means or means of any other type, such as hydraulic.

Consequently, numerous processes and corresponding tools have been developed and proposed, which are capable of providing a precise determination of the fracturing of a formation.

Among the non-acoustic processes, it is possible to mention that known under the name MEST. In this process, the measurements are carried out by electrical or electromagnetic logging, by means of a tool which is lowered into the well. However, the measurements are small in number, by reason of the duration of immobilization of the well during the measurements, and of the relatively long time taken to acquire and to process the data collected by the sensors of the tool. Furthermore, this type of non-acoustic logging can concern only the first few centimeters of the formations surrounding the well, and above all cannot be utilized in cased wells, by reason of the presence of a metallic casing.

Sonic logs also lack suitability for determining the presence of fractures in the formations, for the simple reason that they do not differentiate between a genuine fracture existing in the formation and, for example, a microfissure situated in the wall of the well. In fact, such logs detect any abnormality of the wall which has absorbed part of the energy emitted by the emitters of the measuring tool. Moreover, it should be noted that the presence of a cavity or local deformation in the wall of the well is analysed in the same manner as a microfissure or a fracture. Under these conditions, recourse should be had to other measurements in order to determine whether the abnormality detected is due to any particular modification of the structure of the formations surrounding the well. Finally, sonic logs must be produced in uncased wells, since the processing of the signals which is utilized in these logs is inappropriate for cased wells.

Another sonic process consists in utilizing that to which it is conventional to refer as the "jump of cycles". A "jump of cycles" is a transit time of the compression wave measured between two pickings of two different waves, one of the pickings (sic) being offset by at least one period in relation to the other.

The jumps of cycle which are observed on the recordings are due to variations of amplitude between the two waves which are picked, it being possible for these variations of amplitude to be attributed to fractures when these exist, but likewise to cavities, to a defective picking, early or late, of the arrival of the compression wave, to noise, or to modifications of the lithological structure between transducers. It follows that this technique of the jump of cycle does not exhibit an absolute character of repeatability. In any event, it is not suitable either for cased wells.

Finally, a set of interpretation techniques has been proposed, which is known under the name DETFRA which, in principle, is intended for the determination of fractures. By using a tool referred to as "ARRAY SONIC", the amplitude of the compression waves P and of the shear waves S is measured and calculated. In the presence of fractures, the wave P arriving at an inclined fracture gives rise to a shear wave, which will be called Sp for the sake of greater convenience. Consequently, the receivers receive the customary shear waves S plus those Sp generated by the compression wave P on the inclined fractures. The amplitude of the waves S+Sp which are received on the receivers is thus greater than that of the waves S alone when there are no fractures. As regards the amplitude of the wave P, this is smaller in the presence of fractures. A measurement is then made of the variation of the ratio of the amplitude P to the amplitude of S+Sp. When the ratio decreases, it is inferred from this that there are fractures.

Nevertheless, this new process is limited in its applications. In effect, in order that a wave Sp should be created by a wave P, it is necessary that the fracture generating such waves Sp should exhibit a large slope. In the case of a sub-horizontal fracture, for example, there is no creating of a wave Sp, and the measurements then lead to a non-existence or absence of a fracture, although in reality there is one. In a zone of multiple fractures, there is no longer a single reflecting plane, as is the case for a single fracture, but a plurality of reflecting planes with various orientations. Under these conditions, it will be difficult, if not impossible, to determine the variation of the ratio of the amplitudes measured previously. Furthermore, it is known that other phenomena, such as inclined thin beds, fluid, etc., may lead to the generation of the waves Sp from the waves P, without there being fractures in the zone under consideration. Finally, the ratio of the amplitudes of the waves P/Sp+S may vary for reasons other than fractures. This is, in particular, the case in the event of a lithological change or a change of fluid content in the zone under consideration. Thus, it is difficult to accept that such a process is really capable of discrimination.

A traditional technique for logging which permits determination of the physical characteristics of the formations surrounding and situated in proximity, in the order of one meter, to a drilled well consists in creating, by means of one or more emitter transducers, an acoustic energy which propagates in all or a part of the said formations before reaching one or more receiver transducers which supply signals which are recorded on a recording medium situated, in general, at the surface of the medium to be explored. The recorded signals are then processed in such a manner, on the one hand, as to be able to separate, in particular, the compression waves or P waves from the shear waves or S waves, and, on the other hand, as to calculate the differing average acoustic velocities of the said waves in the formations.

A high degree of effort has been devoted to the improvement of the tools used in such logging and the processing of the recorded signals.

In French application No. 2,431,710, there are described a tool and a process for acoustic logging which are commercially designated EVA, and which provide original solutions to the problems posed by the traditional tools and processes.

French application No. 2,568,020 relates to a process for the processing of the recorded signals, which consists in grouping elementary intercorrelation functions in at least one family, in which the measurement spaces are included within a single predetermined reference space, in transforming the time variables of the said functions in order to bring the size of the measurement space to that of reference, and then in summing the transformed functions.

These processes offer the considerable advantage of being able to separate all the waves received, including the STONELEY waves, in particular by the technique of correlation. Nevertheless, the specialists in acoustic logging were interested only in the compression waves P and shear waves S, the importance of which was fully known in the formulation of the logs of velocities which permitted an improved knowledge of certain petrophysical characteristics of the strata traversed by the well.

Now, it became evident that the STONELEY waves or the pseudo-RAYLEIGH waves could be studied and could contribute to an improved knowledge of the formations traversed by a well. The work undertaken by Messrs. TOKÖZ of the MIT and MATHIEU of ELF AQUITAINE led to the conclusion that the STONELEY wave is affected in the presence of very widely open fractures, the STONELEY wave being, in fact, very highly attenuated by the said fractures. The physical mechanism which links these concepts is based on a transfer of energy in the form of a passage or flow of fluid within permeable formations (SEG. Atlanta 1984).

By pursuing its research on the various waves propagating in a medium, the Applicant has found a novel process for the detection of heterogeneities present in the formations surrounding a drilled well.

A subject of the present invention is thus a process for the detection of the said heterogeneities and/or for the determination of the petrophysical characteristics of the said formations which permits, in particular, the detection of the presence or absence of fractures. The process may also be implemented for the detection of permeable zones including or not including fractures.

The tests which have been carried out have shown that even small fractures could be detected, this taking place in permeable zones, whereas the previous techniques had failed.

The process according to the invention is of the type consisting in selecting the recordings obtained from at least three transducers, one of which is an emitter and another is a receiver, so as to gather pairs of recordings with a common emitter or receiver, and it is defined in that it consists, moreover, in determining for previously selected zones of interest the mean amplitudes of the waves received as a function of the depth; in producing, from the said mean amplitudes, logs of attenuation of the said waves; in selecting from among the attenuation logs those relating to the shear wave and to the wave referred to as the STONELY wave; in determining for each zone the mean value of each one of the said selected attenuation logs; in registering in the said zone and on the said selected attenuation logs the attenuation peaks exceeding a predetermined threshold value; and in comparing, for each zone, at least the peaks of the attenuation log of the shear wave in relation to the corresponding mean value of the part of the attenuation log of the STONELEY wave, in such a manner as to determine the significant relative variations of the attenuations, the said variations being representative of the heterogeneities or the petrophysical characteristics of the geological stratum situated around the said zone.

Further advantages and characteristics will become evident on the reading of an embodiment of the invention, which embodiment is given on an indicative but non-limitative basis, as well as of the accompanying drawings, in which.

Figure 1:
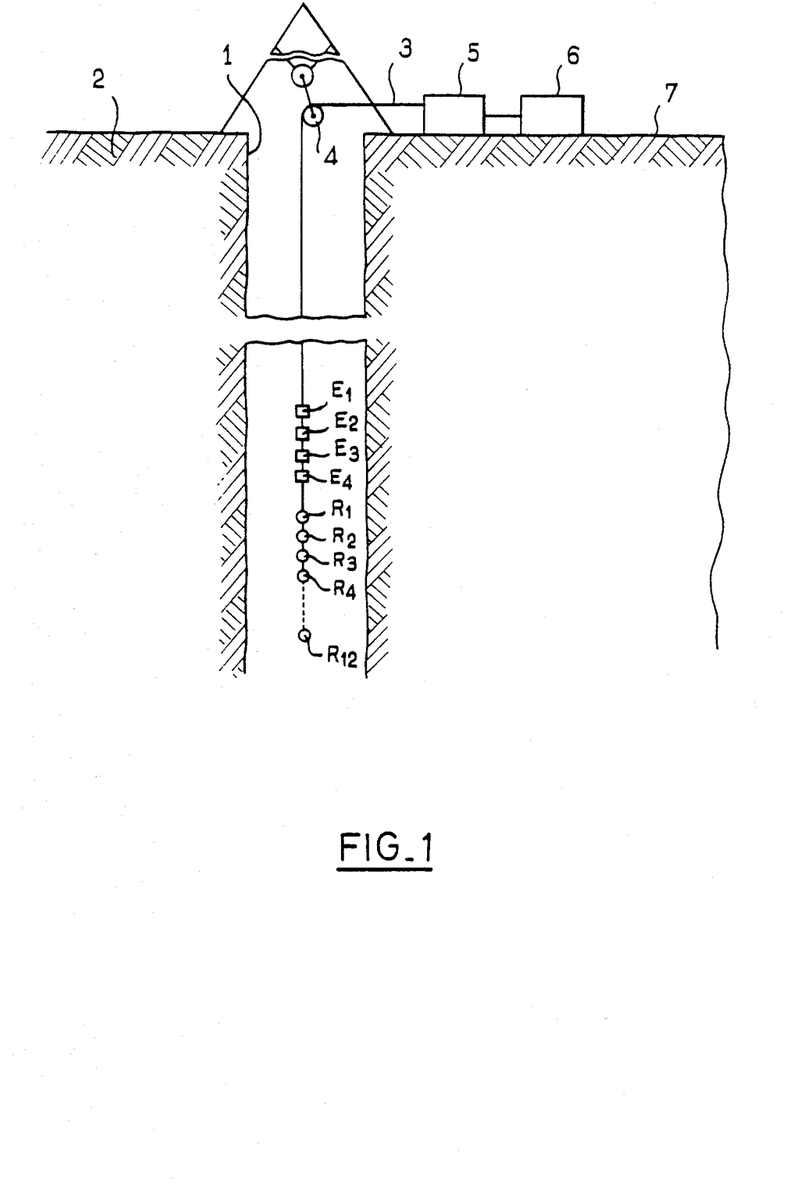
FIG. 1 is a diagrammatic representation of a drilled well, in which a logging tool is disposed.

The process according to the invention was implemented by means of the logging tool called "EVA", which comprises sixteen transducers, four of which $E_1$ to $E_4$ are emitters, the other twelve transducers being receivers $R_1$ to $R_{12}$. The tool is lowered into a well 1 drilled vertically in a medium to be explored 2, by means of a cable 3 wound around a pulley 4 and the movement of which is controlled from control means 5. A recorder 6, disposed at the surface 7 of the medium, records the signals received on the receivers $R_1$ to $R_{12}$ and routed by the cable 3. The emitters $E_1$ to $E_4$ are separated by an interval which is constant and equal, for example, to 0.25 m. The receivers $R_1$ to $R_{12}$ are separated from one another by a constant interval equal, for example, to 1 m. The interval between the last emitter $E_4$ and the first receiver $R_1$ is, for example, equal to 1 meter.

Figure 2:
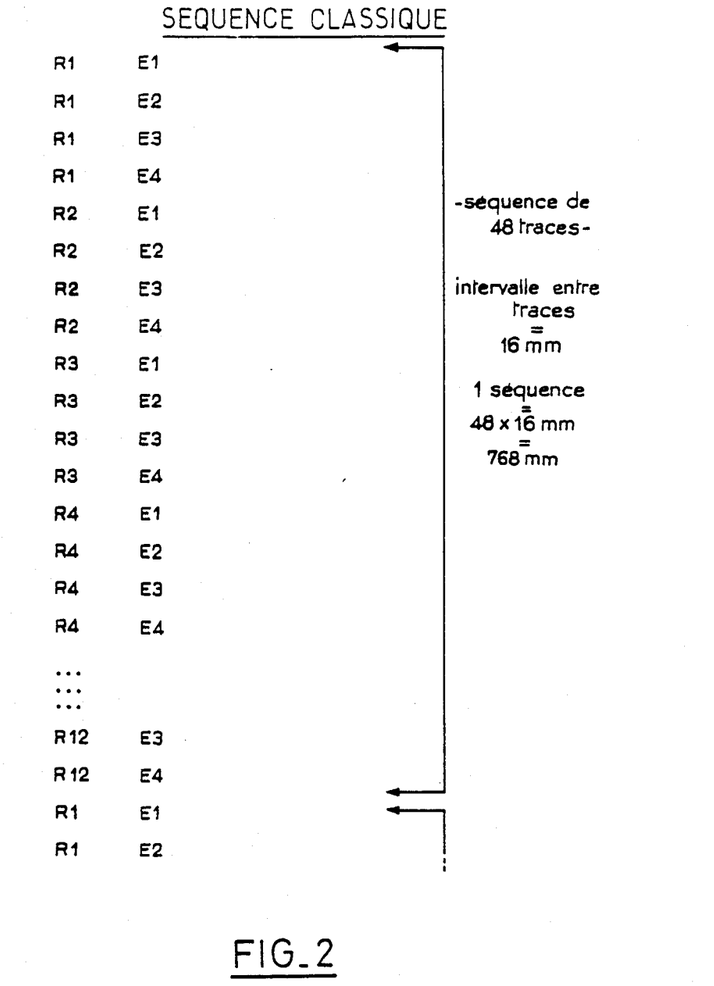
FIG. 2 is a synoptic representation of a traditional logging sequence.
Figure 3:
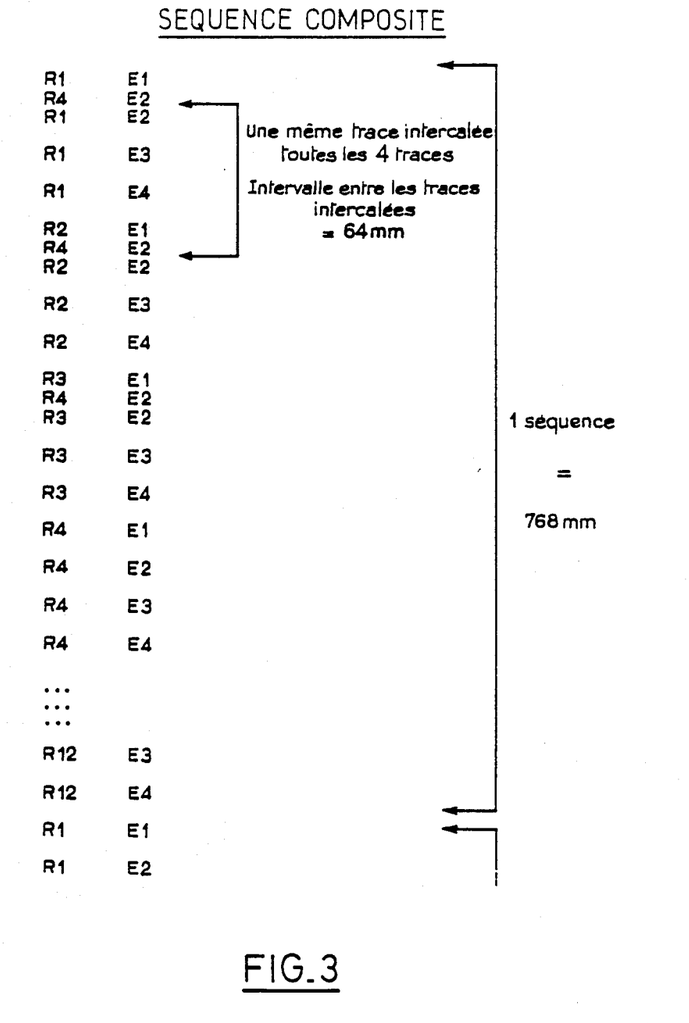
FIG. 3 is a representation of a composite sequence constituted from the traditional sequence of FIG. 2.

Each emission of an acoustic wave by one of the emitters $E_1$ to $E_4$ is received on each one of the receivers $R_1$ to $R_{12}$, and is then recorded on the recorder 6. Such a sequence of emission and of reception or recording is well known and produces what is known as a conventional sequence of 48 recordings or traces with an interval between the traces, for example, of 16 mm. It is this which is represented diagrammatically in FIG. 2. Starting from the conventional sequence, a composite sequence is constructed by intercalate regularly between the recordings of the sequence a trace corresponding to a given emitter-receiver pair' which is selected as a function of the criteria relating to the objectives of the measurement (in particular, a study of the quality of the cementation, detection of incline occurrences, study of the invaded zone). In the example of FIG. 3, there is intercalate between the trace $R_1 E_1$ produced by a wave emitted by the emitter $E_1$ and received on the receiver $R_1$ on the one hand, and the trace $R_1 E_2$ produced by a wave emitted by the emitter $E_2$ and received on the receiver $R_1$, another trace No. 1 $R_4 E_2$ produced by a wave emitted by the emitter $E_2$ and received on the receiver $R_4$. The trace $R_4 E_2$ is intercalate in each sub-sequence constituted by the four emitters $E_1$ to $E_4$ and each one of the receivers $R_1$ to $R_{12}$. In this example, the trace $R_4 E_2$ is repeated every four traces, the interval between two intercalate traces being equal to 64 mm ($4 \times 16$ mm). As a result of this, a sequence such as that represented in FIG. 3 corresponds to a displacement of 768 mm of the tool in the well.

The choice of the intercalate trace $R_4 E_2$ is motivated by the study of the quality of the cementation. In general, this criterion involves the intercalation of traces, the acoustic path of which is short. In the case where incline occurrences are of interest, an average acoustic path would be chosen, for example, corresponding to one of the emitters which is associated with one of the receivers $R_7$ to $R_9$. For the study of the invaded zone, a long acoustic path would be chosen, corresponding, for example, to an emitter $E_2$-receiver $R_{11}$ pair.

Figure 4:
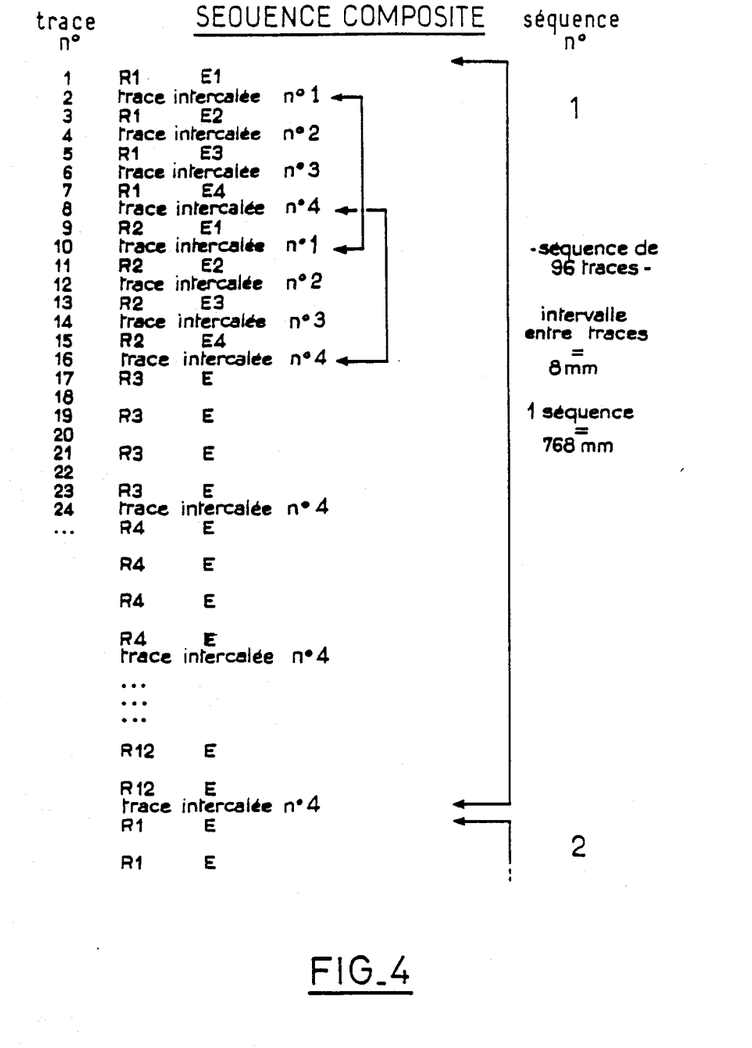
FIG. 4 is a representation of another composite sequence constituted on the basis of the traditional sequence of FIG. 2.

It is also possible to construct a composite sequence of the type represented in FIG. 4 by intercalate four different traces. For example, the trace No. 1 is intercalated between the conventional traces $R_1 E_1$ and $R_1 E_2$; a trace No. 2 is intercalated between the conventional traces $R_1 E_2$ and $R_1 E_3$, and so on. This produces a sequence of 96 traces, with an interval between traces of 8 mm for a total length of displacement of the tool in the well which is in all cases equal to 768 mm.

Figure 5:
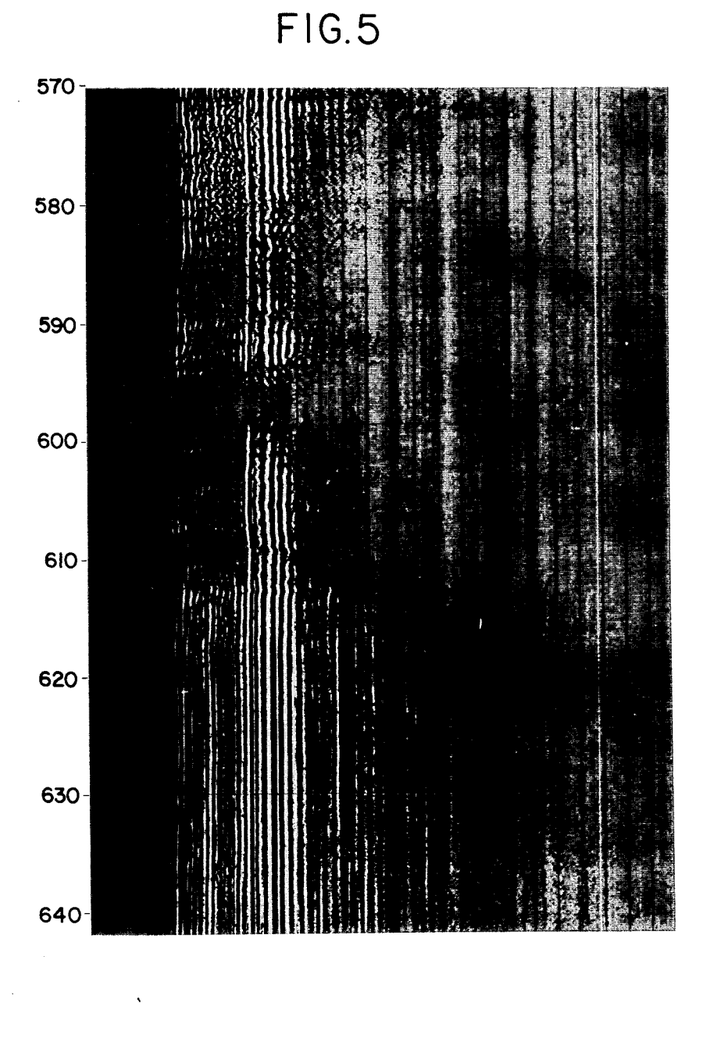
FIGS. 5 to 8 represent adjacent parts of a depth-time section obtained by means of the tool represented in FIG. 1.
Figure 6:
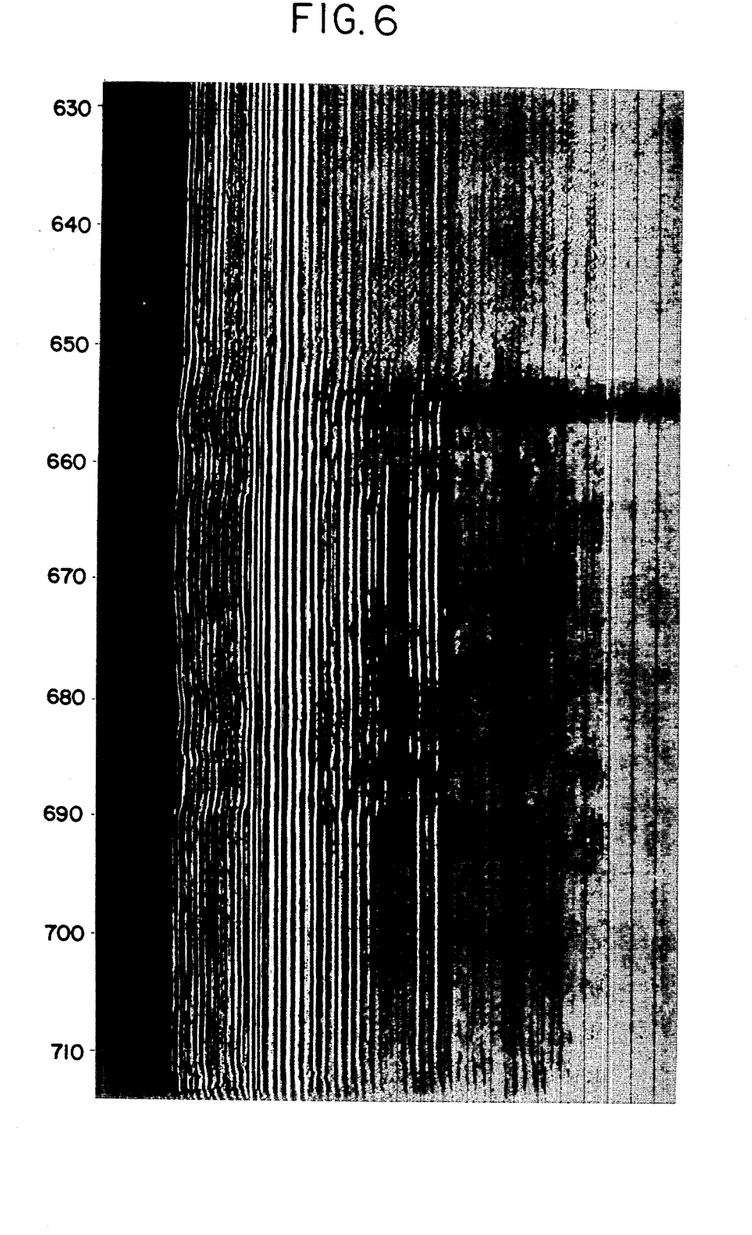
Figure 7:
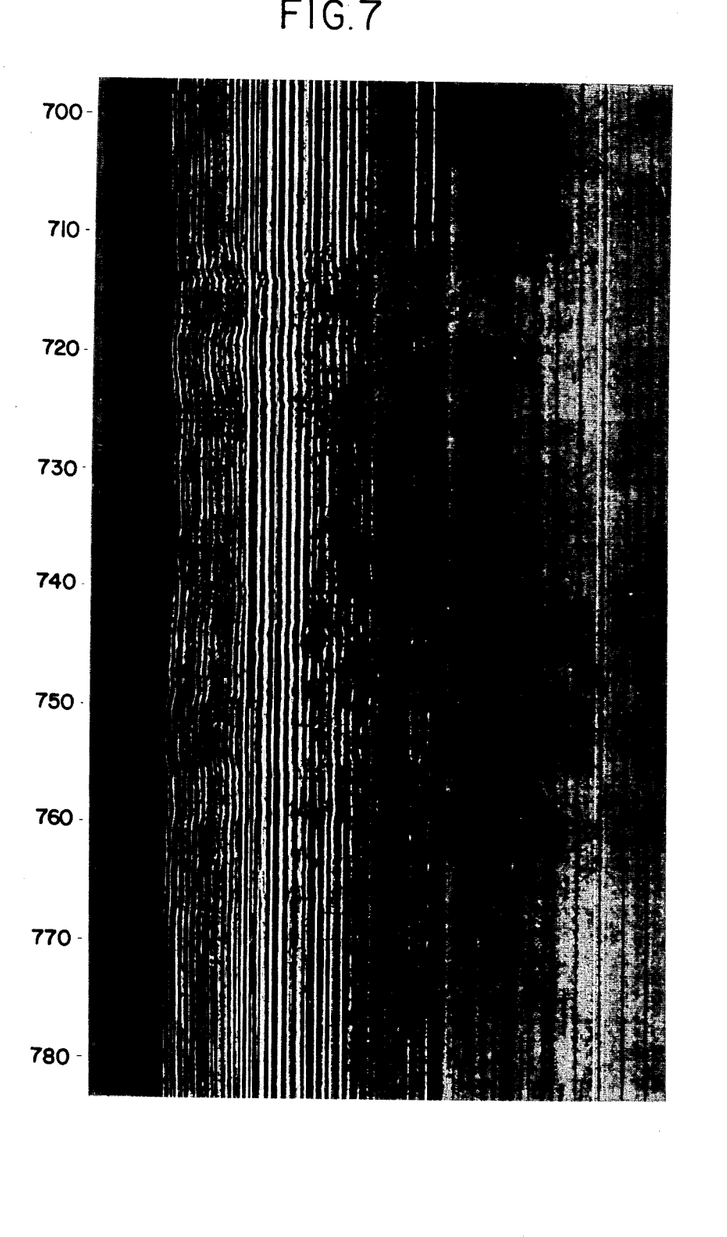
Figure 8:
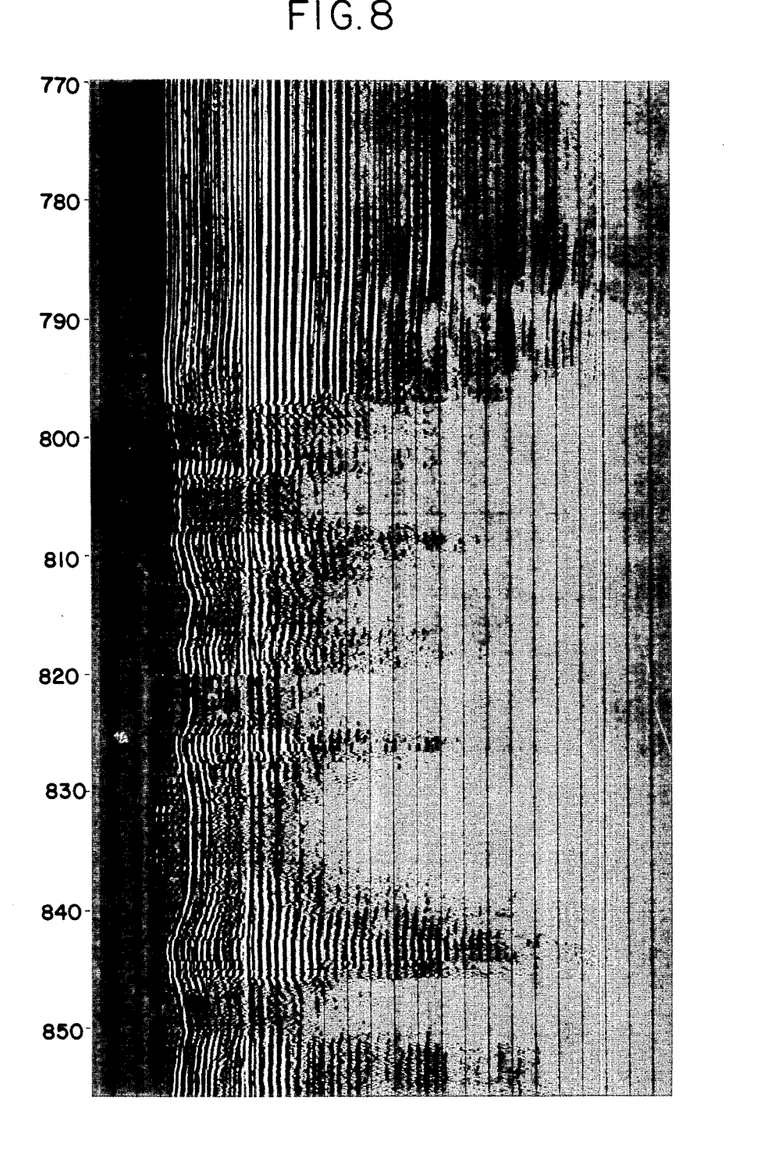

The set of recorded traces is represented, in part, in FIGS. 5 to 8, which constitute that to which it is appropriate to refer as a time-depth section formed of equidistant traces, FIG. 5 being the part of the section for a depth within the range, for example, between 570 and 640 m, while FIGS. 6 to 8 represent the parts of the section for depths within the range between 630 and 715 m, 700 and 780 m, and 770 and 850 m, respectively, the ordinates corresponding to times expressed in milliseconds.

By referring to FIGS. 5 to 8, it can be observed that the section is strongly perturbed or highly chaotic between 550 and 593 m at the location, in particular, of the shear waves S and of the STONELEY waves ST which arrive at times greater than the times of arrival of the shear waves S which, themselves, arrive after the compression waves P.

If this zone is compared with that in the range between 612 and 652 m, it is seen that the appearance is very different.

By referring to FIG. 6, it is found that between 700 and 713 m the section is substantially homogeneous, without any significant change as regards the characteristics of the waves. However, it appears that an "interference phenomenon" is localized around the time of arrival of the S wave for the values 652 and 685 m.

The conventional logs have established that there certainly was a fractured zone between 586 and 606 m, and that there was clearly something at the values 675 m, 687 m, 706 m, 784 m and 790 m, without definiteness being ascribed thereto.

A confirmation and/or a removal of doubt or a detection which would otherwise be impossible to obtain by other means concerning the presence or absence of fractures may be effected by virtue of the present invention.

Initially, a determination is made of a slowness (inverse of the velocity) of the shear waves S and of the STONELEY waves ST by utilizing all the traces with a common receiver, in such a manner as to carry out what is referred to as a BHC, which is an operation of compensation of the variations of diameter of the well or of an obliquity of the measurement tool.

Once the time of arrival of each wave has been determined, the amplitude of each of the said waves is calculated, the said amplitude being obtained by means of a window around the time of arrival and by calculation of the mean amplitude in the said window. Likewise, a determination is made, by the same process, of the attenuation and the period for the P, S and STONELEY waves or those of any other type capable of being used.

Assuming that the amplitude of a wave is given by the formula:

$$A = K \frac{e^{-(ax+b)}}{x^n}$$

in which x represents the acoustic path on which the measurement is made;

a represents the intrinsic attenuation;

n represents the geometric attenuation;

b represents a coupling factor.

For the iso-offset section represented, use has been made of a band-pass filter at most equal to 1–25 kHz for the determination of the amplitude, the period and the attenuation of the P and S waves, and a band-pass filter of 10–20 kHz for the velocity of these waves. So far as concerns the ST waves, band-pass filtering of 1–7 kHz was used.

Figure 9:
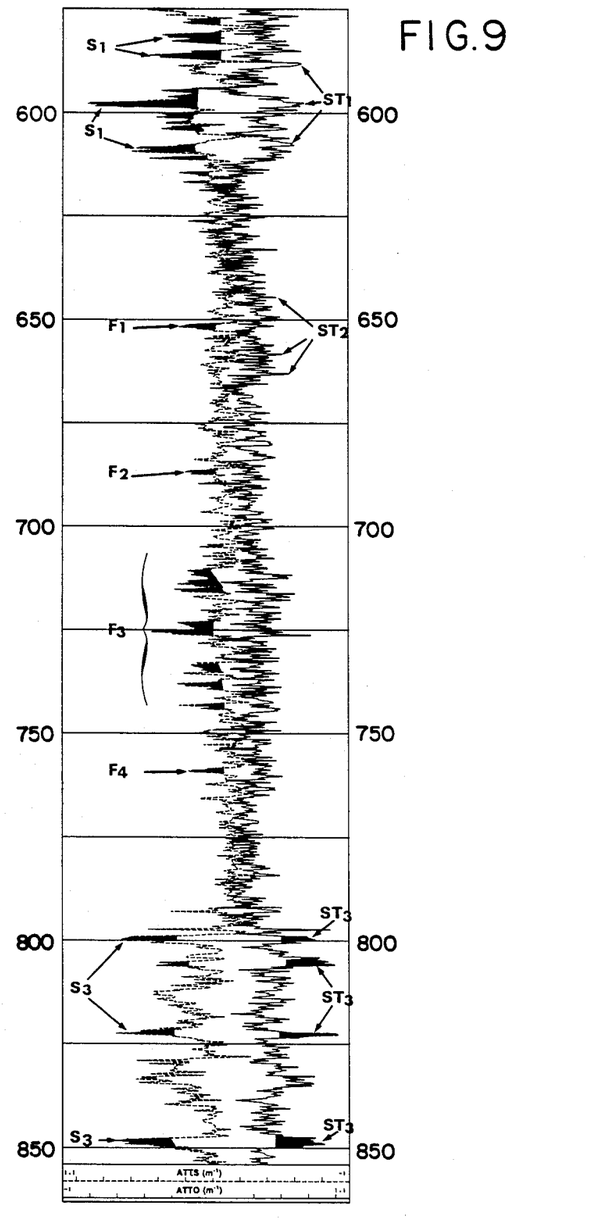
FIG. 9 is a representation of the logs of attenuation of the shear and STONELEY waves corresponding to the section represented in FIGS. 5 to 8.

Subsequently, attenuation logs are produced, of which only those relating to the S and ST waves and for the depth within the range between 575 and 850 m are represented in FIG. 9. In this figure, the attenuation log of the S wave is represented in broken lines and the attenuation log of the ST wave is in solid lines, the attenuation log of the S wave being inverted by 180° in such a manner as to have peaks of attenuation of S and of ST in opposite directions and thus easier to localize and to pick out.

From the two attenuation logs of S and ST, a determination is made, for each one of them, of the mean value in each zone. In fact, the mean value can change from one zone to the other. It is easy to see that the mean value between 575 and 625 m is different from that within the range between 625 and 670 m. Once this mean value, for each zone, has been determined, a threshold is chosen, for example one and a half times the mean value, which is utilized for the localization of the attenuation peaks on the two logs.

By referring to the zone within the range between 575 and 612 m, a measurement is made of the variation of the attenuation of the STONELEY attenuation log which is small, the $ST_1$ peaks which it is possible to pick out are not significant as they are not very far above the mean value for the zone under consideration. In any event, the ratio of the ST peaks to the corresponding mean value is less than 1.5.

In the same zone, within the range between 575 and 612 m, the $S_1$ attenuation peaks of the shear log are, on the other hand, very significant; the ratio of these $S_1$ peaks to the mean value of the attenuation is greater than 1.5.

In the zone under consideration, between 575 and 612 m, there is a double condition, namely a relative stability of the attenuation log of the STONELEY wave, as well as significant $S_1$ attenuation peaks of the attenuation log of the shear wave S. Such a double condition determines the presence of fractures, the depths of which in the drilled well are defined by the significant $S_1$ peaks.

In the zone within the range between 612 and 650 m, the attenuation logs of the STONELEY wave and of the shear wave indicate that there are practically no attenuation peaks or that, in any event, they are not significant. Under these conditions, no fracture is detected.

By proceeding with the measurements indicated previously, it is possible to detect the presence of fractures $R_1$ to $F_4$ at the depth of 652 m, in the zones between 675 and 686 m, between 713 and 728 m and at the depth of 758 m, respectively.

In the zone within the range between 642 and 662 m, the same measurements are made as previously, and it is determined that the $ST_2$ peaks of the STONELEY attenuation log are significant, while the attenuation of the shear wave is substantially constant. This double condition leads to the conclusion that there are practically no fractures except at the depths of 652 and 675 m, and that a porous and/or permeable stratum is present. Thus, on each occasion when a measurement is made of an attenuation peak of the STONELEY wave which corresponds to a relative stability of the attenuation of the shear wave, the conclusion is drawn that a porous and/or permeable stratum is present.

Finally, by referring to the zone within the range between 800 and 850 m, the measurements of the attenuation peaks of the STONELEY and shear waves permit the deduction that they are significant and that they are directed in opposite directions in FIG. 9, by reason of the inversion made of the attenuation log of the STONELEY wave. Once more, a double condition is deduced from this—significant $ST_3$ and $S_3$ peaks— which permits the assertion that there are no fractures, that the corresponding geological stratum is neither porous nor permeable, but that it is probably a clay stratum having a high degree of agrillaceousness.

In the above text, reference has been made to various heterogeneities and/or petrophysical characteristics of the geological strata surrounding the drilled well, which may be vertical as shown in FIG. 1, but likewise a well which is deflected to a slight extent or to a great extent, and even a horizontal well. In the case of a zone including fractures having a high degree of opening, of the conduit or drain type, the shear and STONELEY attenuation logs then exhibit significant peaks which are substantially opposite one another, similar to the $S_3$ and $ST_3$ peaks shown in FIG. 9, which permit the detection of an appreciable argillaceousness in the zone of the well under consideration. In order to eliminate the doubt between argillaceousness and fracture of a high degree of opening, reference is made to other measurements such as thoe relating to the acoustic velocities of the various waves which are present. In fact, the measurement of the acoustic velocities of the waves which have been propagated in the geological stratum situated between 800 and 850 m permits the determination, with precision, of whether or not an argillaceousness stratum is present. In the case where this measurement of acoustic velocities leads to the conclusion that the said geological stratum does not exhibit a high degree of argillaceousness, the significant peaks which are measured on the parts of the attenuation logs corresponding to the said geological stratum then permit the assertion, without ambiguity, that fractures having a high degree of opening are situated in the said geological stratum.

The tests which have been carried out have demonstrated the great benefit of the present invention for the detection and/or the very precise location of certain heterogeneities exhibited by the geological strata surrounding a well. Thus, in certain drillings, it has been possible to detect the presence of fractures having a low degree of opening, which fractures could not have been detected by the traditional techniques.

We claim:

1. A process for the processing of signals recorded in the course of acoustic logging in a drilled well traversing a medium to be explored, for the determination of heterogeneities and/or of the petrophysical characteristics of the geological strata surrounding the said drilled well, of the type comprising the steps of selecting the recordings obtained from at least three transducers, of which one is an emitter and another is a receiver, in such a manner as to gather pairs of recordings with a common emitter or receiver, which process further comprises:

determining, for previously selected zones of interest, the mean amplitudes of the waves received as a function of the depth;

producing, from the said mean amplitudes, logs of attenuation of the said waves;

selecting from among the attenuation logs those relating to the shear wave and to the wave referred to as the STONELEY wave;

determining, for each zone, the mean value of each one of the said selected attenuation logs;

registering, in the said zone and on the said selected attenuation logs, the attenuation peaks exceeding a predetermined threshold value; and comparing, for each zone, at least the peaks of the attenuation log of the shear wave in relation to the corresponding mean value of the part of the attenuation log of the STONELEY wave, in such a manner as to determine variations of the attenuations representative of the heterogeneities or the petrophysical characteristics of the geological stratum situated around the said zone.

2. The process as claimed in claim 1, wherein one of the STONELEY or shear attenuation logs is inverted by 180° in relation to the other.

3. The process as claimed in claim 1, wherein a fracture having a first degree of opening in a given geological stratum is detected by the presence of at least one attenuation peak of the shear log while the corresponding part of the attenuation log of the STONELEY wave varies approximately around an average value.

4. The process as claimed in claim 1, wherein a permeable or porous geological stratum is detected by the presence of at least one attenuation peak of the STONELEY log corresponding to a relative stability of the shear attenuation log.

5. The process as claimed in claim 3, wherein a stratum having a first degree of argillaceousness is detected by the presence of a least one attenuation peak of the shear attenuation log corresponding to at least one attenuation peak of the STONELEY attenuation log.

6. The process as claimed in claim 5, wherein a fracture having a second degree of opening in a given geological stratum greater than said first degree of opening is detected by the presence of at least one significant peak of the shear attenuation log corresponding to a significant peak of the STONELEY attenuation log after other measurements, such as measurements of the acoustic velocities of the various waves which are present, have determined the absence of a second degree of argillaceousness greater than said first degree of argillaceousness in said geological stratum.

7. The process as claimed in claim 1, wherein said process is implemented with a composite acquisition sequence comprising a number of conventional recordings corresponding to the number of transducers employed and of previously selected recordings which are regularly intercalated between said conventional recordings.

* * * * *